United States Patent
Li et al.

(10) Patent No.: US 9,972,040 B2
(45) Date of Patent: *May 15, 2018

(54) INTELLIGENTLY DETERMINING BUYING ONLINE AND PICKING UP IN STORE BASED ON COMMUTE PATTERNS OF CONNECTIONS IN A SOCIAL NETWORK AND STORE PARAMETERS

(71) Applicant: International Business Machines Corporation, Armonk, NY (US)

(72) Inventors: Jialin Li, Westford, MA (US); Pradeep K. Nanjundaswamy, Bangalore (IN); Leho Nigul, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/658,765

(22) Filed: Jul. 25, 2017

(65) Prior Publication Data

US 2017/0337607 A1    Nov. 23, 2017

Related U.S. Application Data

(63) Continuation of application No. 15/156,811, filed on May 17, 2016.

(51) Int. Cl.
*G06Q 30/00*    (2012.01)
*G06Q 30/06*    (2012.01)
(Continued)

(52) U.S. Cl.
CPC ..... *G06Q 30/0617* (2013.01); *G06F 17/2705* (2013.01); *G06Q 50/01* (2013.01)

(58) Field of Classification Search
CPC .......................... G06Q 30/06; G06Q 30/0613
(Continued)

(56) References Cited

U.S. PATENT DOCUMENTS

| | | | |
|---|---|---|---|
| 8,554,875 B1 * | 10/2013 | Alfaro | G06Q 50/01 709/218 |
| 2003/0061147 A1 * | 3/2003 | Fluhr | G06Q 30/06 705/37 |

(Continued)

FOREIGN PATENT DOCUMENTS

WO    2013155055 A2    10/2013

OTHER PUBLICATIONS

"Self-Organizing Customer Order Pickup Delivery via Mobile Social Networks". IP.com No. IPCOM000237874DIP.com Electronic Publication Date: Jul. 17, 2014 <http://ip.com/IPCOM/000237874>.

(Continued)

*Primary Examiner* — Yogesh C Garg
(74) *Attorney, Agent, or Firm* — Edward P. Li

(57) ABSTRACT

A method for determining buying online and picking up in store. A computer receives from a shopper a request for buying online and picking up in store. The computer parses stores carrying an item purchased online and connections of the shopper in a social network. The computer provides the shopper with a list of one or more connections for picking up the item for the shopper. The computer sends to one of the one or more connections a token for picking up the item and information of a store where the item is picked up, after the shopper chooses the one of the one or more connections for picking up the item. The computer sends to the shopper a notification, after the item is picked up by the one of the one or more connections for picking up the item.

1 Claim, 3 Drawing Sheets

(51) Int. Cl.
*G06F 17/27* (2006.01)
*G06Q 50/00* (2012.01)

(58) Field of Classification Search
USPC .............................................. 705/26.1, 26.41
See application file for complete search history.

(56) References Cited

U.S. PATENT DOCUMENTS

| | | |
|---|---|---|
| 2004/0177008 A1 | 9/2004 | Yang |
| 2011/0055046 A1* | 3/2011 | Bowen .................. G06Q 10/08 705/26.41 |
| 2011/0144898 A1* | 6/2011 | Konig .................. G01C 21/343 701/532 |
| 2012/0173308 A1 | 7/2012 | Brown et al. |
| 2013/0253832 A1 | 9/2013 | Nallu et al. |
| 2013/0325663 A1 | 12/2013 | Scipioni et al. |
| 2014/0040043 A1 | 2/2014 | Barron et al. |
| 2014/0129380 A1 | 5/2014 | Nuzzi et al. |
| 2014/0279238 A1 | 9/2014 | Jones et al. |
| 2015/0317708 A1 | 11/2015 | Eramian |
| 2016/0086255 A1* | 3/2016 | Sainfort ............. G06Q 30/0637 705/26.41 |
| 2017/0046756 A1* | 2/2017 | Glasgow ............ G06Q 30/0613 |
| 2017/0236177 A1* | 8/2017 | Sebastian ........... G06Q 30/0617 705/14.11 |

OTHER PUBLICATIONS

Suh et al., "Leveraging Socially Networked Mobile ICT Platforms for the Last-Mile Delivery Problem", Environmental Science & Technology, published: Aug. 9, 2012, Issue 46, © 2012 American Chemical Society, pp. 9481-9490.

"Self-Organizing Customer Order Pickup and Delivery via Mobile Social Networks", An IP.com Prior Art Database Technical Disclosure, Authors et. al.: Disclosed Anonymously, IP.com No. IPCOM000237874D, IP.com Electronic Publication Date: Jul. 17, 2014, 6 pages.

"Taxi Shopping", An IP.com Prior Art Database Technical Disclosure, Authors et. al.: Disclosed Anonymously, IP.com No. IPCOM000218992D, IP.com Electronic Publication Date: Jun. 14, 2012, 2 pages.

Li et al., "Intelligently Determining Buying Online and Picking Up in Store Based on Commute Patterns of Connections in a Social Network and Store Parameters", U.S. Appl. No. 15/156,811, filed May 17, 2016 pp. 1-20.

IBM Appendix P.: "List of IBM Patents or Patent Applications to be Treated as Related", Dated Jul. 25, 2017. Two pages.

* cited by examiner

INTELLIGENTLY DETERMINING BUYING ONLINE AND PICKING UP IN STORE BASED ON COMMUTE PATTERNS OF CONNECTIONS IN A SOCIAL NETWORK AND STORE PARAMETERS

BACKGROUND

The present invention relates generally to online commerce, and more particularly to computer-implemented intelligently determining buying online and picking up in store based on commute patterns of connections in a social network and store parameters.

There are two common scenarios for online shopping. In one scenario, items purchased online are shipped from stores; in another scenario, items purchased online are picked up in stores by online shoppers. Nowadays, buying online and picking up in store has been popular. Online shoppers purchase merchandise from stores' websites and pick up in selected stores. For buying online and picking up in store, a seller commits to an online shopper that an item purchased online is ready to be picked up in a specific store and at a specific time. Generally, a shopper inputs a zip code or a list of stores for pickup, and an ecommerce system calculates availability accordingly.

SUMMARY

A method for determining buying online and picking up in store is provided. The method is implemented by a computer. The method includes receiving from a shopper a request for buying online and picking up in store. The method further includes parsing stores carrying an item purchased online and connections of the shopper in a social network. The method further includes accessing commute and location information of the connections of the shopper in the social network. The method further includes determining commute patterns of the connections, based on the commute and location information. The method further includes analyzing parameters of the stores and the commute patterns of the connections. The method further includes providing the shopper with a list of one or more connections for picking up the item for the shopper. The method further includes providing to the shopper a suggestion of an optimal connection for picking up the item for the shopper. The method further includes sending to one of the one or more connections a token for picking up the item and information of a store where the item is picked up, in response to that the shopper chooses the one of the one or more connections for picking up the item. The method further includes sending to the shopper a notification, in response to that the item is picked up by the one of the one or more connections for picking up the item. In the method, the stores carrying the item purchased online include stores which are within paths of the connections of the shopper in the social network. In the method, the shopper chooses one of two ways to receive the item: picks up the item from the one of the one or more connections for picking up the item and the one of the one or more connections for picking up the item delivers the item to the shopper.

DETAILED DESCRIPTION

Figure 1:
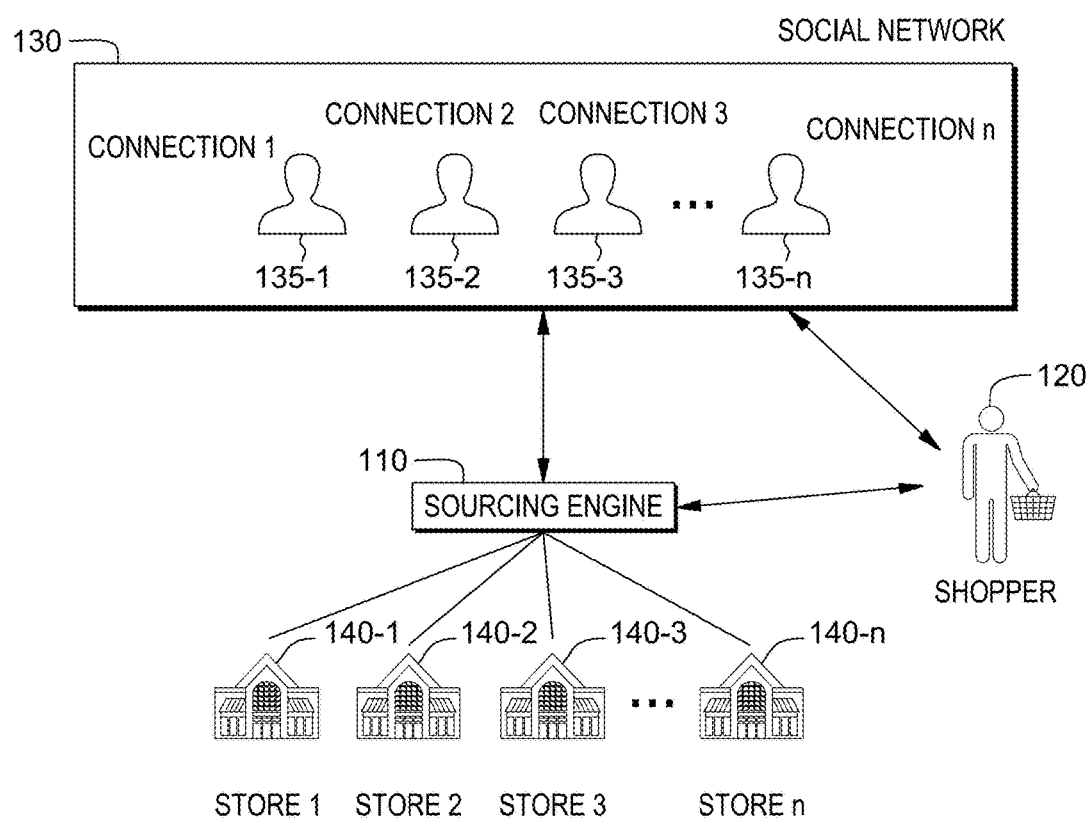
FIG. 1 is a diagram illustrating a system for intelligently determining buying online and picking up in store based on commute patterns of connections in a social network and store parameters, in accordance with one embodiment of the present invention.

FIG. 1 is a diagram illustrating a system for intelligently determining buying online and picking up in store based on commute patterns of connections in a social network and store parameters, in accordance with one embodiment of the present invention. The system comprises sourcing engine 110. Sourcing engine 110 is capable of intelligently determining buying online and picking up in store, based on commute patterns of connections in a social network and store parameters. Shopper 120 orders an item online and selects picking up in store within a certain period of time. Sourcing engine 110 conducts inventory availability calculations. Connections 1 through n (135-1 through 135-n) of shopper 120 in social network 130 share their commute information and location information with shopper 120. Sourcing engine 110 gets from a device of shopper 120 the commute information and the location information and takes them into consideration for the inventory availability calculations. Therefore, sourcing engine 110 provides shopper 120 with more availability options for the item ordered online; the availability options do not only include available stores where shopper 120 can pick up the item, but also include available stores where connections 1 through n (135-1 through 135-n) can pick up the item for shopper 120. Sourcing engine 110 provides shopper 120 with information of stores 1 through n (140-1 through 140-n) where the item can be picked up; the information includes locations of the stores 1 through n (140-1 through 140-n) and time to pick up. Shopper 120 may ask one of connections 1 through n (135-1 through 135-n) to pick up the item at one of stores 1 through n (140-1 through 140-n). Upon an agreement, shopper 120 selects the location of the one of stores 1 through n (140-1 through 140-n), and chooses the one of connections 1 through n (135-1 through 135-n) to pick up the item. Sourcing engine 110 sends the information of picking up the item to the one of connections 1 through n (135-1 through 135-n). The one of connections 1 through n (135-1 through 135-n) comes to the one of stores 1 through n (140-1 through 140-n) to pick up the item for shopper 120. After the item is picked up by the one of connections 1 through n (135-1 through 135-n), sourcing engine 110 sends a notification to shopper 120 and informs that the item has been picked up by the one of connections 1 through n (135-1 through 135-n). Then, shopper 120 picks up the item from the one of connections 1 through n (135-1 through 135-n). Alternatively, the one of connections 1 through n (135-1 through 135-n) may deliver the item to shopper 120.

Connections 1 through n (135-1 through 135-n) set preferences regarding commute and location information availability for shopper 120. In social network 130 connections 1 through n (135-1 through 135-n) determines what part of the information will be available for shopper 120. Sourcing engine 110 is capable of accessing the commute and location information available for shopper 120. Sourcing engine 110 obtains commute patterns of connections 1 through n (135-1 through 135-n) by continuous location tracking.

The commute information will not be shared with stores 1 through n (140-1 through 140-n) and the visibility of commute information will be restricted to shopper 120. The commute information is accessible by sourcing engine 110. An application running on a device or system of shopper 120 yields the commute information of the connections and superposes on a graph of store availability.

From the commute patterns of connections 1 through n (135-1 through 135-n), sourcing engine 110 derives some parameters which are used for conducting inventory availability calculations. The parameters include approximate commute time and commute duration. Some other parameters related to the commute pattern include traffic and weather. The parameters may be predictive or real-time.

Figure 2:
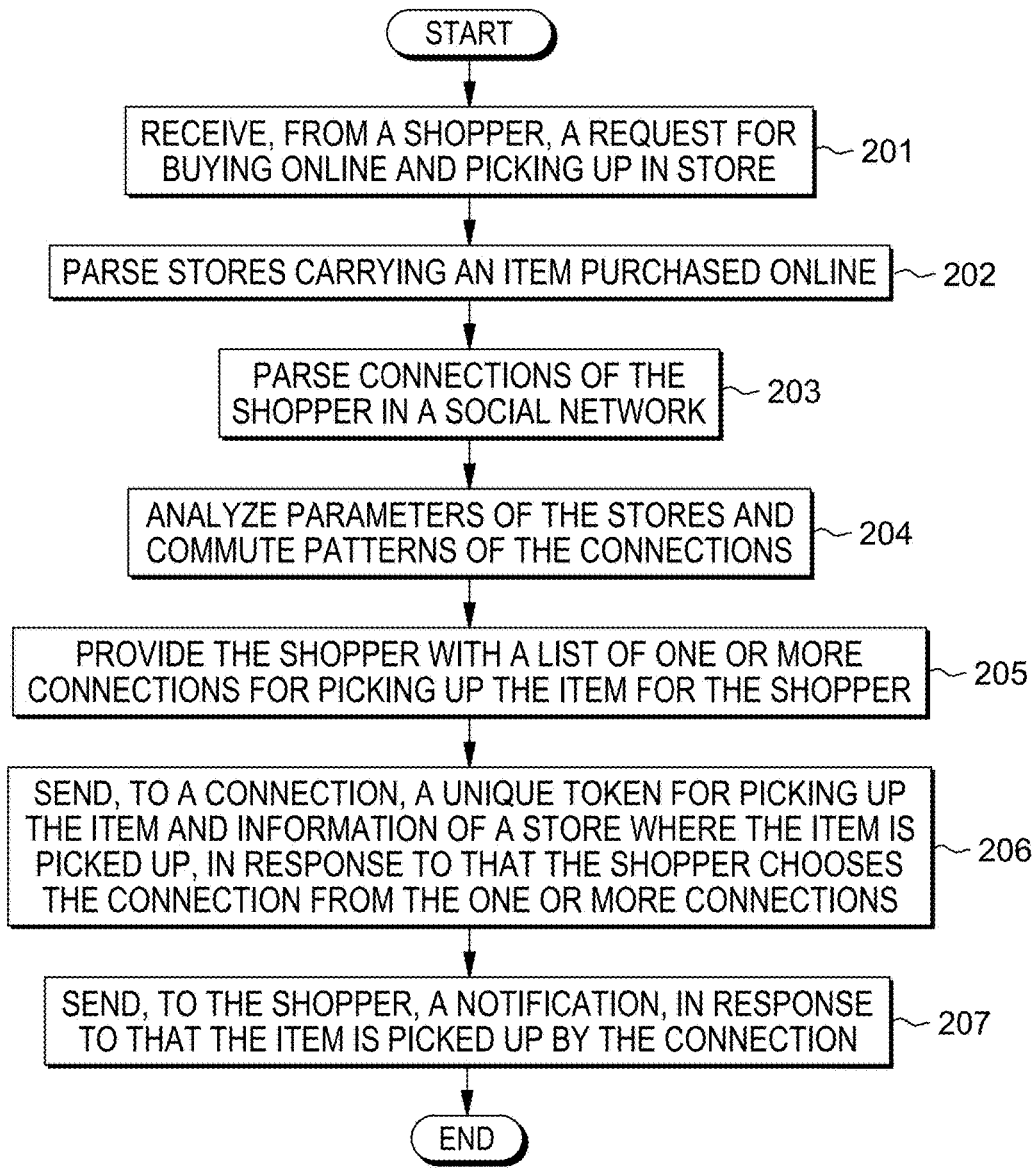
FIG. 2 is a flowchart showing operational steps of a sourcing engine for intelligently determining buying online and picking up in store based on commute patterns of connections in a social network and store parameters, in accordance with one embodiment of the present invention.

FIG. 2 is a flowchart showing operational steps of sourcing engine 110 (shown in FIG. 1) for intelligently determining buying online and picking up in store based on commute patterns of connections in a social network and store parameters, in accordance with one embodiment of the present invention. At step 201, sourcing engine 110 (shown in FIG. 1) receives from a shopper (for example shopper 120 shown in FIG. 1) a request for buying online and picking up in store. At step 202, sourcing engine 110 parses one or more stores (for example stores 140-1 through 140-n shown in FIG. 1) which carry an item purchased online by the shopper. At step 203, sourcing engine 110 parses one or more connections (for example connections 135-1 through 135-n shown in FIG. 1) of the shopper in a social network (for example social network 130 shown in FIG. 1). Sourcing engine 110 does not limit the store search to nearby stores, for example stores in and around the area of the shopper's zip code. The item purchased online by the shopper may not be available in one or more stores near the shopper but in one or more stores that are far away from the shopper's location. However, picking up the item by one of the connections may be quicker and more beneficial. It may be more beneficial for the shopper to buy from a store that is within a commute path of one of the connections; for example, the price or service is more competitive because of the local promotion or the local tax. Therefore, the parsed stores at step 202 does not only include stores where the shopper can pick up the item, but also includes stores where the connections can pick up the item.

At step 204, sourcing engine 110 analyzes parameters of the stores and commute patterns of the connections. For example, sourcing engine 110 analyzes how quickly the item can be delivered to the shopper, price variations based on locations, local promotions, effort and energy that the connections must take, and deviated commute paths and impacts on connections' routine schedules. Based on analysis at step 204, sourcing engine 110 at step 205 provides the shopper with a list of one or more connections for picking up the item for the shopper. Sourcing engine 110 may suggest an optimal connection based on the analysis.

The shopper and one of the one or more connections may reach a mutual agreement for picking up the item. In response to that the shopper chooses the one of the one or more connections, sourcing engine 110 at step 206 sends the one of the one or more connections a unique token for picking up the item and information of a store where the item is picked up. For example, the token may be a QR code. The information of the store may include the store's address and directions.

The one of the one or more connections uses the token and picks up the item at the store. In response to that the item is picked up by the one of the one or more connections, at step 207, sourcing engine 110 sends to the shopper a notification. The notification informs the shopper that the item is picked up by the one of the one or more connections.

Figure 3:
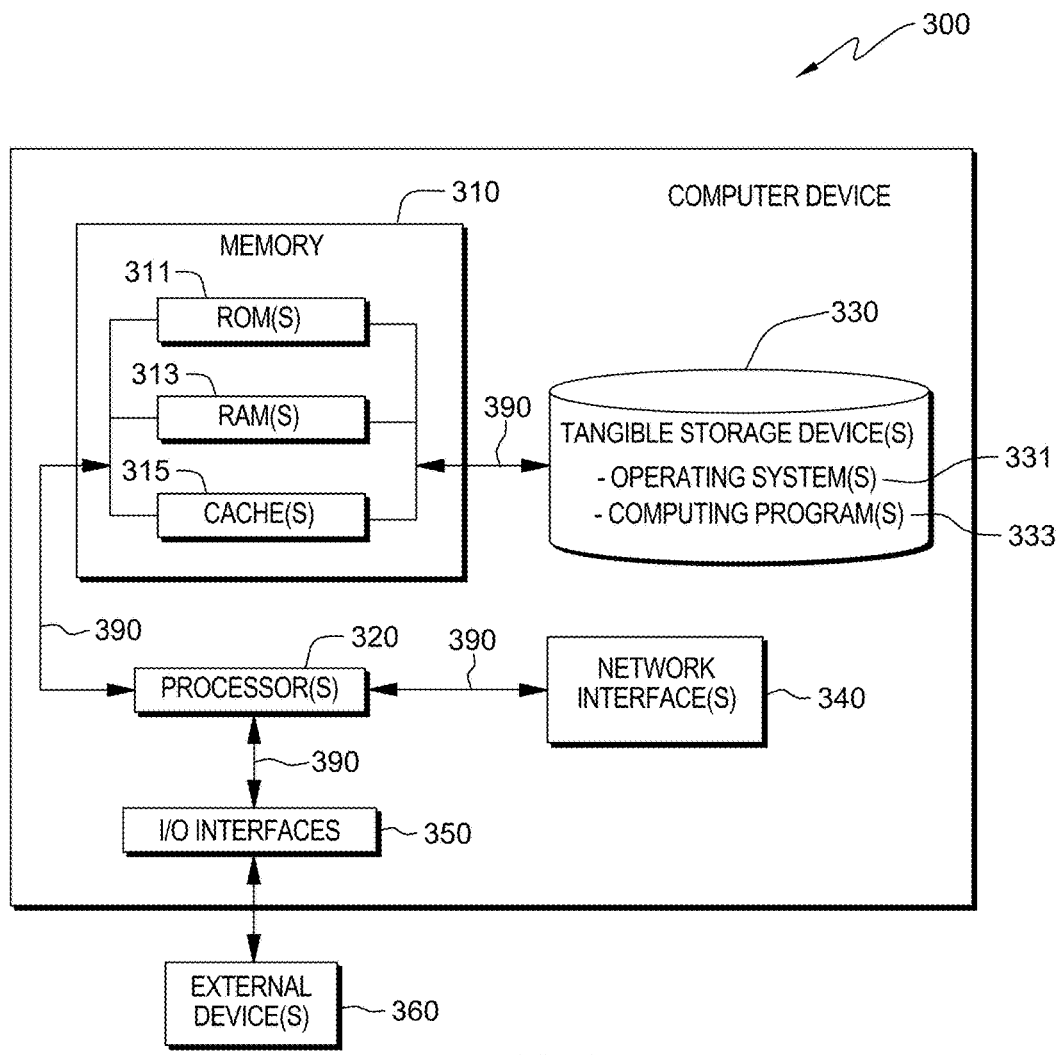
FIG. 3 is a diagram illustrating components of a computer device hosting a sourcing engine for intelligently determining buying online and picking up in store based on commute patterns of connections in a social network and store parameters, in accordance with one embodiment of the present invention.

FIG. 3 is a diagram illustrating components of computer device 300 hosting a sourcing engine for intelligently determining buying online and picking up in store based on commute patterns of connections in a social network and store parameters, in accordance with one embodiment of the present invention. It should be appreciated that FIG. 3 provides only an illustration of one implementation and does not imply any limitations with regard to the environment in which different embodiments may be implemented.

Referring to FIG. 3, computer device 300 includes processor(s) 320, memory 310, and tangible storage device(s) 330. In FIG. 3, communications among the above-mentioned components of computer device 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330. One or more computer programs 333 include one or more computer programs for intelligently determining buying online and picking up in store based on commute patterns of connections in a social network and store parameters. Computer device 300 further includes I/O interface(s) 350. I/O interface(s) 350 allows for input and output of data with external device(s) 360 that may be connected to computer device 300. Computer device 300 further includes network interface(s) 340 for communications between computer device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining buying online and picking up in store, the method comprising:
    receiving, by a computer, from a shopper, a request for buying online and picking up in store;
    parsing, by the computer, stores carrying an item purchased online;
    parsing, by the computer, connections of the shopper in a social network, for determining commute and location of the connection of the shopper;
    accessing, by the computer, the commute and location information of the connections of the shopper in the social network;
    determining, by the computer, commute patterns of the connections, based on the commute and location information;
    analyzing, by the computer, parameters of the stores and the commute patterns of the connections, for determining a list of one or more connections for picking up the item for the shopper;
    providing, by the computer, the shopper with the list of the one or more connections for picking up the item for the shopper;
    providing to the shopper, by the computer, a suggestion of an optimal connection for picking up the item for the shopper;
    sending to one of the one or more connections, by the computer, a token for picking up the item and information of a store where the item is picked up, in response to that the shopper chooses the one of the one or more connections for picking up the item;
    sending, by the computer, to the shopper a notification, in response to that the item is picked up by the one of the one or more connections for picking up the item;

wherein the stores carrying the item purchased online include stores which are within paths of the connections of the shopper in the social network; and wherein the shopper chooses one of two ways to receive the item: picks up the item from the one of the one or more connections for picking up the item and the one of the one or more connections for picking up the item delivers the item to the shopper.

\* \* \* \* \*